(12) United States Patent
Le Lay et al.

(10) Patent No.: US 9,993,991 B2
(45) Date of Patent: Jun. 12, 2018

(54) COMPOSITE PANEL FOR FLOORS OR WALLCOVERING COMPONENTS, AND METHOD FOR MANUFACTURING SUCH A PANEL

(71) Applicant: LES STRATIFIES, Paris (FR)

(72) Inventors: Loïc Le Lay, Acq (FR); Laurent Baclet, Belleu (FR); Julien Scagnetti, Maignelay-Montigny (FR)

(73) Assignee: LES STRATIFIES, Paris (FR)

( * ) Notice: Subject to any disclaimer, the term of this patent is extended or adjusted under 35 U.S.C. 154(b) by 180 days.

(21) Appl. No.: 14/895,877

(22) PCT Filed: Jun. 4, 2014

(86) PCT No.: PCT/IB2014/061948
§ 371 (c)(1),
(2) Date: Dec. 3, 2015

(87) PCT Pub. No.: WO2014/195884
PCT Pub. Date: Dec. 11, 2014

(65) Prior Publication Data
US 2016/0114556 A1    Apr. 28, 2016

(30) Foreign Application Priority Data

Jun. 6, 2013 (FR) .................................... 13 55243

(51) Int. Cl.
*B32B 5/12* (2006.01)
*B32B 5/02* (2006.01)
(Continued)

(52) U.S. Cl.
CPC ................ *B32B 5/12* (2013.01); *B32B 3/06* (2013.01); *B32B 3/12* (2013.01); *B32B 5/024* (2013.01);
(Continued)

(58) Field of Classification Search
CPC ....................................................... B32B 5/12
(Continued)

(56) References Cited

U.S. PATENT DOCUMENTS

2006/0204714 A1    9/2006  Wang
2009/0072086 A1    3/2009  Smith
2010/0055384 A1*   3/2010  Doecker ................... B32B 3/12
                                                    428/113

FOREIGN PATENT DOCUMENTS

GB    2477091 A  *  7/2011  ............... B32B 3/12
WO    92/17331 A1    10/1992

OTHER PUBLICATIONS

"Tedtex composite fabrics", Zeatex Australia, Feb. 8, 2013 (Feb. 8, 2013), XP002719798, retrieved from the Internet: URL : http : //smithuren. com/'wp-c o n t e nt/pdfs/Zedtex_Compo sit e_Fab rics_Br o chure_A4.p d f [retrieved Feb. 5, 2014].*

(Continued)

*Primary Examiner* — Brent T O'Hern
(74) *Attorney, Agent, or Firm* — Christensen O'Connor Johnson Kindness PLLC

(57) ABSTRACT

A lightweight composite panel, and resisting to impacts and to peeling, comprising:
 a honeycomb core in poly(p-phenyleneterephthalamide), on either side of which are positioned two skins each comprising:
 an internal ply comprising:
  a fabric of glass fiber E in contact with the honeycomb core; and
  a web of unidirectional carbon fibers oriented along a first direction;
 an external ply, in contact with the corresponding internal ply, comprising:
  a web of unidirectional carbon fibers oriented along a second direction different from the first direction, the web of each external ply facing the web of the corresponding internal ply; and
  a fabric of glass fiber E.

(Continued)

The fabrics of glass fiber are impregnated with at least 70% by weight of epoxy resin, and have a mass of less than or equal to 30 g/m².

The webs of carbon fibers have an elastic modulus comprised between 275 and 300 GPa, are pre-impregnated with between 30% and 40% by weight of epoxy resin, and have a mass of less than or equal to 100 g/m².

14 Claims, 3 Drawing Sheets

(51) Int. Cl.
    *B32B 5/26* (2006.01)
    *B32B 3/06* (2006.01)
    *B32B 3/12* (2006.01)
    *B60R 13/01* (2006.01)
    *B32B 27/12* (2006.01)
    *B32B 27/34* (2006.01)
    *B32B 37/12* (2006.01)
    *B32B 37/14* (2006.01)

(52) U.S. Cl.
    CPC ............... *B32B 5/26* (2013.01); *B32B 27/12* (2013.01); *B32B 27/34* (2013.01); *B32B 37/12* (2013.01); *B32B 37/142* (2013.01); *B60R 13/01* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2307/50* (2013.01); *B32B 2307/558* (2013.01); *B32B 2307/718* (2013.01); *B32B 2471/00* (2013.01); *B32B 2479/00* (2013.01); *B32B 2605/18* (2013.01); *B32B 2607/02* (2013.01)

(58) Field of Classification Search
    USPC .......................................................... 428/109
    See application file for complete search history.

(56) References Cited

OTHER PUBLICATIONS

"Technical fabrics handbook. HexForce®Reinforcements", Hexcel, Dec. 21, 2010 (Dec. 21, 2010), XP002719799, retrieved from the Internet: URL:http://www.hexcel.com/Resources/Datasheets/Brochure-D a t a- Sheets/Hex F orce _T echnical_ F abrics . . . H andbook.pdf [retrieved Feb. 1, 2014].*

"Technical fabrics handbook. HexForce® Reinforcements", Hexcel, Dec. 21, 2010 (Dec. 21, 2010), XP002719799, retrieved from the Internet:URL:http://www.hexcel.com/Resources/Datasheets/Brochure-Data-Sheets/Hex F orce _T echnical_ F abrics . . . F abrics . . . H andbook.pdf [retrieved Feb. 1, 2014].*

Mancha, A.J., "Optimization of Lightweightsandwich Structures ff Commercial Aircraft Interior Parts Subjected to Low-Velocity Impact," Universidad Pontificia Comillas Madrid, Escuela Tecnica Superior de Ingenierla (ICAI) <URL:http://www.iit.upcomillas.es/pfc/resumenes/4fd71dd20c849.pdf> retrieved Feb. 5, 2012, 3 pages.

"Technical fabrics handbook. HexForce® Reinforcements," Hexcel <:http://www.hexcel.com/Resources/DataSheets/Brochure-Data-Sheets/HexForce Technical Fabrics Handbook.pdf> retrieved Feb. 1, 2012, 2 pages.

"Zedtex Composite Fabrics," Zedtex Australia <http://smithuren.com/wp-content/pdfs/Zedtex_Composite_Fabrics_Brochure> retrieved Dec. 3, 2015, 4 pages.

International Search Report dated Aug. 25, 2014, issued in corresponding International Application No. PCT/IB2014/061948, filed Jun. 4, 2014, 3 pages.

Written Opinion of the International Searching Authority dated Aug. 25, 2014, issued in corresponding International Application No. PCT/IB2014/061948, filed Jun. 4, 2014, 10 pages.

International Preliminary Report on Patentability dated Dec. 8, 2015, issued in corresponding International Application No. PCT/IB2014/061948, filed Jun. 4, 2014, 1 page.

* cited by examiner

COMPOSITE PANEL FOR FLOORS OR WALLCOVERING COMPONENTS, AND METHOD FOR MANUFACTURING SUCH A PANEL

FIELD OF THE DISCLOSURE

Embodiments of the present disclosure relate to a composite panel for floors or wall covering components of the partition, side panel or piece of furniture type, as well as to a method for manufacturing such a panel.

BACKGROUND

In many sectors and notably aeronautics, the gain in weight is a major issue for improving the energy efficiency of the equipment.

The gain in weight is generally in contradiction with the other major issue of these sectors: mechanical strength.

In the example of an aircraft, many elements consist of composite materials associating low weight and increased mechanical strength.

Presently, floors or wall covering components in majority consist of composite panels comprising a central honeycomb core (or "nida-core"), and of two "skins" attached on either side of the honeycomb core. These skins comprise one or several layers of identical or different materials.

In particular, the composite panels presently used are formed with a stack of layers consisting of an aluminium ⅛ nida-core (3.2 mm mesh) of specific gravity 98 kg/m³ from Hexcel© or from Alcore Brigantine© and of an external skin of the poly(p-phenyleneterephthalamide) 20914 type (better known under its trade name of Kevlar®), woven according to a weave of the 4H satin type, and pre-impregnated with an epoxy resin 1454 from Hexcel©.

Draping is made manually with the possibility of covering the whole of the decorative plies of fabric, without any impact on the mechanical strength of the panels.

Attachment inserts are provided for attaching these panels on supports in the position of use. The inserts presently used are in stainless steel adhesively bonded by means of a structural adhesive or of the densification resin type with a diameter of 30 mm.

The edges of each panel are covered with a specific bordering resin of density 0.68.

Present panels have the advantage of being very resistant to peeling, i.e. to the separation of different layers. They are therefore floors resistant to wear and to friction generated by the passing of the users.

Nevertheless, present panels have many drawbacks. Their mass always remains too high relatively to the increasingly restrictive construction requirements as regards aircraft.

Further, they have a more substantial deflection under a local load than a panel according to the embodiments comprising carbon skins. This phenomenon comes from the fact that the Kevlar® fiber used for the skins is a more elastic fiber than carbon fiber.

Finally, they have low resistance to impact and require being covered with a protective layer, for example carpeting.

SUMMARY

Embodiments of the present disclosure therefore are directed to allowing the making of a floor or light-weight wall covering component, rigid under a local load and resistant to impacts and to peeling.

Embodiments of the present disclosure propose replacement of the aluminium honeycomb core with a Kevlar® honeycomb core.

This material is known for its great sensitivity to peeling and in practice is not used for producing honeycomb cores for this type of panels.

Embodiments of the present disclosure notably allow the use of such a material for the honeycomb core while retaining excellent properties against peeling but also mechanical properties.

According to an embodiment, a composite panel is provided, characterized in that it comprises:

a honeycomb core in poly(p-phenyleneterephthalamide), on either side of which are positioned:

an internal ply in contact with the honeycomb core, and comprising:

a glass fiber tissue E impregnated with at least 70% by weight of epoxy resin, and with a mass of less than or equal to 30 g/m², the fabric being in contact with the honeycomb core; and a web of unidirectional carbon fibers oriented according to a first direction, with an elastic modulus comprised between 275 and 300 GPa, with a mass of less than or equal to 100 g/m², and pre-impregnated with between 30% and 40% by weight of an epoxy resin;

an external ply, in contact with the corresponding internal ply, comprising:

a web of unidirectional carbon fibers oriented along a second direction different from the first direction of the carbon fiber web of the internal ply, with an elastic modulus comprised between 275 and 300 GPa, with a mass of less than or equal to 100 g/m², and pre-impregnated with between 30% and 40% by weight of an epoxy resin. The unidirectional carbon fiber web of each external ply facing the web of unidirectional carbon fibers of the corresponding internal ply; and a glass fiber fabric E with a mass of less than or equal to 30 g/m², and pre-impregnated with at least 70% by weight of epoxy resin.

It is notably the presence of a web of fabric of glass fibers of the type E over-impregnated with epoxy resin (at least 70% of impregnation) found in contact with the Kevlar® honeycomb which gives the possibility of obtaining resistance to peeling as great as that of the panels of the state of the art. This glass web is also found on the outer face of the skin in order to provide protection against corrosion induced by the carbon (for example corrosion of the aluminium sub-structure of airplanes) and against local impacts.

According to other embodiments:

the epoxy resin may be self-extinguishable;

the honeycomb core may have a direction L a so-called "ribbon direction" and a direction W a so-called "expansion direction", perpendicular to the direction L, and wherein the first direction of the web of unidirectional carbon fibers is perpendicular to the direction L with the ribbon direction;

the second direction of the carbon fiber web of the external ply may form an angle with the first direction of the carbon fiber web of the internal ply, comprised between 45° and 135°, preferably between 60° and 120°, advantageously 90°;

the panel may further comprise between an internal ply and an external ply, at least one, preferably between one and four unidirectional carbon fiber webs with a mass of less than or equal to 100 g/m², pre-impregnated with between 30% and 45% by weight of an epoxy resin, and oriented along the same second direction as that of the unidirectional carbon fibers of the unidirectional carbon fiber web of the external plies;

the glass fibers E may have:
  a maximum tensile strength equal to 3,400 MPa,
  an elastic modulus of about 70,000 MPa and
  a relative specific gravity equal to 2.5 g/cm$^3$;

the carbon fibers may have:
  a maximum tensile strength comprised between 4,000 and 7,000 MPa,
  an elastic modulus comprised between 275,000 and 300,000 MPa and
  a relative specific gravity equal to 1.8 g/cm$^3$;

the panel may further comprise a fabric with pararamide fibers associated with a polyetherimide (PEI) resin; and/or the panel may further comprise attachment inserts in polyamide-imide (Torlon®).

According to another embodiment, a method is provided for manufacturing a previous composite panel, characterized in that it comprises the following steps:

(a) depositing on either side of a honeycomb core in poly(p-phenyleneterephthalamide), an internal ply, comprising:

in contact with the honeycomb core, a glass fiber fabric E with a mass of less than or equal to 30 g/m$^2$, and pre-impregnated with at least 70% by weight of epoxy resin; and in contact with the glass fiber fabric E, a web of unidirectional carbon fibers with an elastic modulus comprised between 275 and 300 GPa with a mass of less than or equal to 100 g/m$^2$, and pre-impregnated with between 30% and 40% by weight of an epoxy resin, positioned so that the carbon fibers are oriented along a first direction;

(c) depositing on the unidirectional carbon fiber web of each internal ply, an external ply comprising:

facing the web of unidirectional carbon fibers of the corresponding internal ply, a web of unidirectional carbon fibers positioned so that the fibers are oriented along a second direction, different from the first direction of the web of carbon fibers of the internal ply, with an elastic modulus comprised between 275 and 300 GPa with a mass of less than or equal to 100 g/m$^2$, and pre-impregnated with between 30% and 40% by weight of an epoxy resin; and in contact with the web of unidirectional carbon fibers oriented along the second direction, a glass fiber fabric E with a mass of less than or equal to 30 g/m$^2$, and pre-impregnated with at least 70% by weight of epoxy resin, in order to obtain a stack of composite layers.

According to other embodiments:

the method may further comprise ea step (b), between step (a) and step (c), for depositing at least a web of unidirectional carbon fibers with a mass of less than or equal to 100 g/m$^2$, and pre-impregnated with between 30% and 40% by weight of an epoxy resin, oriented along the same second direction as that of unidirectional carbon fibers of the unidirectional carbon fiber web of the external plies deposited in step (c);

prior to step (a), each face of the honeycomb core may be machined with a milling machine including a saw at the end of the milling cutter; and/or the panel may be locally machined on at least one portion of its thickness, in order to produce wells in which are positioned attachment inserts in polyamide-imide held in position by an adhesive.

DESCRIPTION OF THE DRAWINGS

Features of the present disclosure will become apparent from the detailed description hereafter made with reference to the appended drawings which respectively.

DETAILED DESCRIPTION

In the present description, the words and expressions hereafter have the following definitions:

Web: a web is a unidirectional assembly of non-woven fibers and held together by any means, such as a glue, a resin, an adhesive. As opposed to this, a fabric is a bidirectional interlace (warp and mesh) of intertwined fibers according to one or several weaves (for example canvas, satin, twill, or other weaves)

Pre-impregnated: a pre-impregnated web or fabric comprises a resin mixed with the web or fabric during its manufacturing, before producing the panel.

The impregnation percentage or resin percentage is the ratio between the total weight of the web or of the pre-impregnated fabric, and the weight of resin, the whole multiplied by a hundred.

A glass fiber of type E has the following chemical features:

| | Glass of type E |
|---|---|
| $SiO_2$ | 53-55% |
| $Al_2O$ | 14-15% |
| CaO | 17-23% |
| MgO | 1% |
| $Na_2CO_3$ | 0.8% |
| $B_2O_3$ | 0-8% |
| $Fe_2O_3$ | 0.3% |
| $TiO_2$ | 0.5% |
| $ZrO_2$ | / |

Its mechanical properties are then more or less substantial depending on the weaving of the latter for forming a web.

Figure 1:
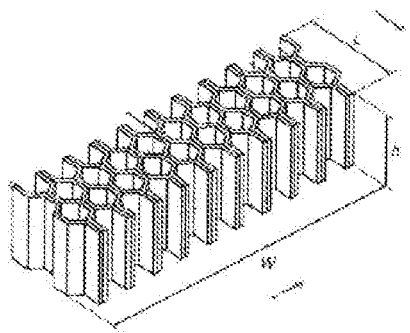
FIG. 1, illustrates a schematic perspective view of a honeycomb layer used in a panel.

A layer having a honeycomb structure (see FIG. 1) comprises three directions perpendicular to each other: the direction W in a so-called «expansion direction» (generally taken as an angular reference: 0°), the direction L a so-called «ribbon direction», perpendicular to the direction W (90° relatively to the direction W which is at 0°), and the direction h representing the height of the layer.

Intermediate modulus: a carbon fiber is said to be of an «intermediate modulus» when it has a Young modulus (or elastic modulus) comprised between 275 and 300 GPa. On the contrary, a carbon fiber is said to be «with a high modulus» when it has a Young modulus (or elastic modulus)

comprised between 350 and 450 GPa, and a carbon fiber is said to be «with low resistance» or standard when it has a Young modulus (or elastic modulus) of less than 240 GPa.

Glass fibers may be classified in the following way: so-called «standard» glass fibers E which have a Young modulus (or elastic modulus) of 70 GPa, glass fibers S and R so-called "with high resistance" and which have a Young modulus (or elastic modulus) comprised between 85 and 90 GPa, and glass fibers D providing very good dielectric properties. Other glass fibers also exist for resistance in a basic medium (AR glass), in a chemical medium (C glass) and in an acid medium (E-CR glass).

FIGS. 2 to 7 illustrate embodiments of a composite panel according to the disclosure.

Figure 2:
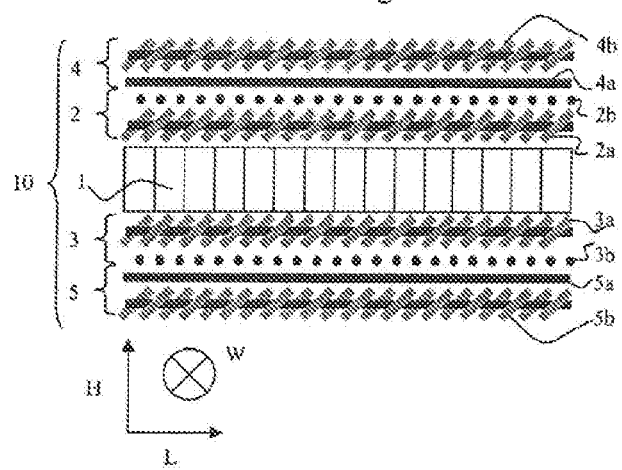
FIG. 2, illustrates a schematic sectional view of a first embodiment of a panel.

The panel 10 illustrated in FIG. 2 comprises:
- a Kevlar® honeycomb core 1 (poly(p-phenyleneterephthalamide)), on either side of which are positioned:
- an internal ply 2-3 in contact with the honeycomb core 1, and an external ply 4-5, in contact with the corresponding internal ply (i.e. on the same side relatively to the honeycomb layer 1).

Each internal ply 2-3 comprises:
- a glass fiber fabric E 2a-3a with a mass of less than or equal to 30 g/m² pre-impregnated with at least 70% by weight of an epoxy resin. The fabric 2a-3a is in contact with the honeycomb core 1; and
- a web 2b-3b of unidirectional carbon fibers with an intermediate modulus oriented along a first direction, with an elastic modulus comprised between 275 and 300 GPa, with a mass of less than or equal to 100 g/m² pre-impregnated with between 30% and 40% by weight of an epoxy resin.

The glass fiber fabric of type E of low mass (less than or equal to 30 g/m²) overloaded with resin (more than 70% of epoxy resin) in contact with the honeycomb layer 1 gives the possibility of obtaining excellent resistance to peeling in spite of the use of Kevlar® for the honeycomb. This strength is just as great as that of the panels of the state of the art, or even better. Measurement of the resistance to peeling was carried out by the measurement method, a so-called « climbing drum » measurement, according to the prescriptions of the aeronautical certification ASTM D1781.

The glass fiber fabric according to the disclosure also gives the possibility of obtaining an excellent protection against corrosion induced by carbon (for example corrosion of the aluminium sub-structure of airplanes) and against local impacts.

The measurement of resistance to corrosion was carried out according to the prescriptions of the aeronautical certification ABD0031.

The measurement of resistance to local impacts was carried out according to the prescriptions of the aeronautical certification ASTM D3029 and the aeronautical prescriptions Airbus© AITM1.0057.

The web 2b-3b of unidirectional carbon fibers is oriented along a first direction of orientation of the carbon fibers. The latter may be the L direction of the ribbon direction of the honeycomb (90°) or the direction W perpendicular to this ribbon direction (0°), i.e. the expansion direction.

Advantageously, the first direction of orientation of the carbon fibers of the webs 2b and 3b is the direction W, perpendicular to the ribbon direction (0°), i.e. the direction of expansion.

In FIG. 2, this orientation is schematized by a line of points representing the cross-sectional fibers. Of course, this representation is not the scale and in reality, the fibers are much closer to each other.

This arrangement allows a gain in resistance of the panel to deformation of more than about 4% at the deformed panel.

Each external ply 4-5 comprises:
- a web 4a-5a of unidirectional carbon fibers with an intermediate modulus, an elastic modulus comprised between 275 and 300 GPa, with a mass of less than or equal to 100 g/m² pre-impregnated with between 30% and 40% by weight of an epoxy resin.
- a glass fiber tissue E 4b-5b with a mass of less than or equal to 30 g/m² pre-impregnated with at least 70% by weight of epoxy resin. The fabric 4b-5b is in contact with the ambient medium.

The webs 4a-5a are positioned facing the webs 2b-3b of unidirectional carbon fibers of the corresponding internal ply.

The unidirectional carbon fibers of the webs 4a-5a are oriented along a second direction, different from the first direction of the web 2b-3b of carbon fibers of the internal ply.

The second direction of the web of carbon fibers of the external ply forms an angle with the first direction W of the web of carbon fibers of the internal ply, comprised between 45° and 135°, preferably between 60° and 120°.

Advantageously, the angle between the second and the first direction is 90° (+/−3°). In other words, the carbon fibers of the web of an external ply are perpendicular to the carbon fibers of the web of the corresponding internal ply. This means that the second direction of orientation of the carbon fibers of the webs 2b and 3b is the direction L in the ribbon direction.

By observing a positioning perpendicular to the carbon fibers of the external ply relatively to the carbon fibers of the corresponding internal ply it is possible to guarantee better resistance of the external ply to deformation but also to impacts and to mechanical stresses only if the angle between both webs is different from 90° (+/−3°).

The epoxy resin used for impregnating the webs 2b-3b-4a-5a of carbon fibers and the fabrics 2a-3a-4b-5b of glass fibers is a developed epoxy resin of the EP137 type from Gurit© which meets the requirements of resistance to fire of the aeronautical standard FAR 25.853 but also of smoke emanation, toxicity and evolvement of heat of the aeronautical certification ABD0031.

The carbon fibers have:
- a maximum tensile strength preferably equal to 5,600 MPa. The maximum tensile strength may be comprised between 4,000 and 7,000 MPa
- an elastic modulus of 290,000 MPa. The elastic modulus may be comprised between 275,000 and 300,000 MPa; and
- a relative specific gravity equal to 1.8 g/cm³.

The fabric 4b-5b of glass fiber used in the external plies is identical with the one used in the internal plies.

The glass fibers E have:
- a maximum tensile strength preferably equal to 3,400 MPa.
- an elastic modulus of the order of 70,000 MPa.
- a relative specific gravity equal to 2.5 g/cm³.

The maximum tensile strength and the elastic modulus are measured by the ASTM D3379 method.

The relative specific gravity is measured by the ASTM D3800 method.

The use, in the internal and external plies of unidirectional carbon fibers with an intermediate elastic modulus allows better resistance to forces relatively to carbon fibers with high resistance.

In order to manufacture a composite panel according to the disclosure, the following method is applied:

In a step (a), on either side of a honeycomb core 1 in poly(p-phenyleneterephthalamide) is deposited an internal ply 2-3, comprising:

in contact with the honeycomb core 1, a fabric 2a-3a of glass fiber E with a mass of less than or equal to 30 g/m$^2$ pre-impregnated with at least 70% by weight of epoxy resin; and in contact with the fabric 2a-3a of glass fibers E, a web 2b-3b of unidirectional carbon fibers with an elastic modulus comprised between 275 and 300 GPa with a mass of less than or equal to 100 g/m$^2$ pre-impregnated with between 30% and 40% by weight of an epoxy resin, and, positioned so that the carbon fibers are oriented along a first direction.

In a step (c), depositing on the web 2b-3b of unidirectional carbon fibers of each internal ply 2-3, an external ply 4-5 comprising:

facing the web 2b-3b of unidirectional carbon fibers of the corresponding internal ply, a web 4a-5a of unidirectional carbon fibers positioned so that the fibers are oriented along a second direction, different from the first direction of the carbon fiber web 2b-3b of the internal ply, with an elastic modulus comprised between 275 and 300 GPa with a mass of less than or equal to 100 g/m$^2$ pre-impregnated with between 30% and 40% by weight of an epoxy resin; and in contact with the web 4a-5a of unidirectional carbon fibers oriented along the second direction, a fabric 4b-5b of glass fiber E with a mass of less than or equal to 30 g/m$^2$ pre-impregnated with at least 70% by weight of epoxy resin, in order to obtain a composite layer stack.

For certain applications, the number of webs of carbon fibers may be increased in order to meet additional stiffness requirements. For this, between step (a) and step (c), intermediate plies, each consisting of a single web of unidirectional carbon fibers, are deposited along the same second direction as the one of unidirectional carbon fibers of the web of unidirectional carbon fibers of the external plies deposited in step (c).

After applying step (c), these intermediate plies are inserted between the internal plies and the external plies.

The webs of carbon fibers used in the intermediate plies are identical with those used in the internal and external plies.

These embodiments are illustrated in FIGS. 3 to 6 wherein the panel respectively comprises one (6a), two (6a-6b), three (6a-6b-6c), four (6a, 6b, 6c, 6d) and five (6a, 6b, 6c, 6d, 6e) additional webs of carbon fibers of low mass (less than or equal to 100 g/m$^2$), with an intermediate elastic modulus and pre-impregnated with a self-extinguishable epoxy resin (from 30% to 40% by weight of impregnation).

According to the disclosure, the orientation of the additional webs of unidirectional carbon fibers is always along the ribbon direction (90°).

This arrangement gives the possibility of obtaining a panel having optimum resistance to deformation of the panels relatively to the overall weight of the panel.

The Kevlar® honeycomb core 1 (poly(p-phenyleneterephthalamide)) advantageously has a specific gravity comprised between 72 kg/m$^3$ and 96 kg/m$^3$.

The honeycomb core 1 used advantageously has a mesh size of 0.4 mm and a paper thickness comprised between 70 μm and 72 μm. The height h of the core 1 is calculated according to the thickness of the skin (formed by an internal ply, an external ply and optionally one or several intermediate plies) and the thickness of the composite panel required by aircraft manufacturers in order to meet the prescriptions required for the panel.

For example, a web of unidirectional carbon fibers and its glass fiber canvas E has a thickness of 0.125 mm. A single web of unidirectional carbon fibers has a thickness of 0.1 mm.

Figure 3:
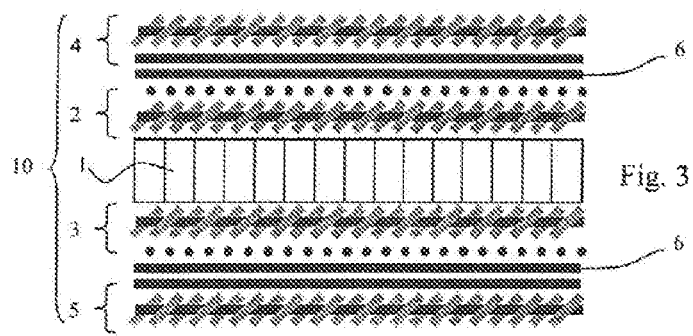
FIGS. 3 to 7, illustrate schematic sectional views of five embodiments of a panel comprising additional reinforcement layers.
Figure 4:
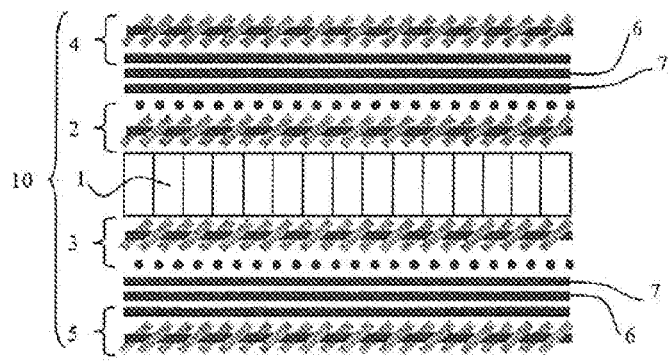
Figure 5:
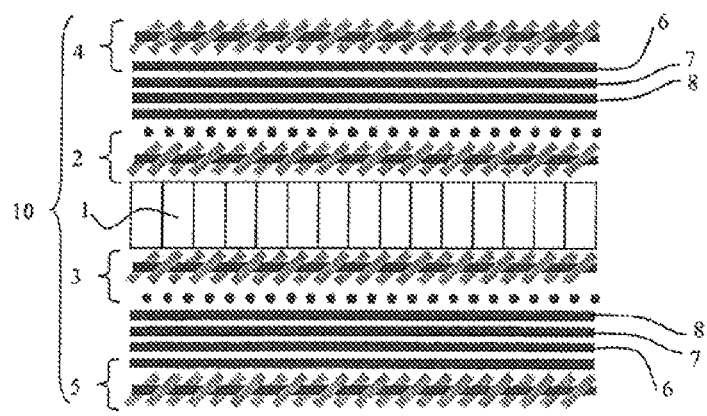
Figure 6:
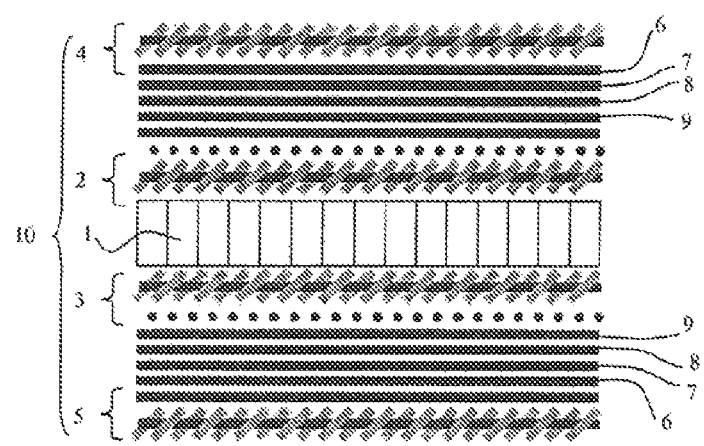
Figure 7:
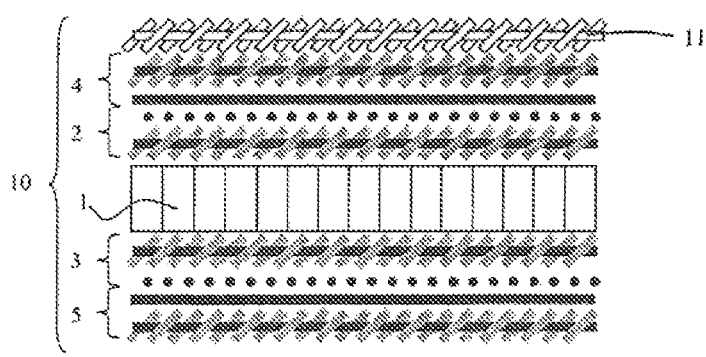

For example:
for the embodiment of FIG. 2, the height h of the core 1 is 9.5 mm in order to meet the requirement of a panel with a thickness of 10 mm (combined core and skins);
for the embodiment of FIG. 3, the height h of the core 1 is 9.3 mm;
for the embodiment of FIG. 4, the height h of the core 1 is 15.1 mm in order to meet the requirement of a panel with a thickness of 16 mm (combined core and skins);
for the embodiment of FIG. 5, the height h of the core 1 is 14.9 mm;
for the embodiment of FIG. 6, the height h of the core 1 is 14.7 mm;
for the embodiment of FIG. 7, the height h of the core 1 is 9.5 mm.

The use of a core 1 with a specific gravity of 96 kg/m$^3$ is recommended in order to be able to observe punching stresses of the order of 150 daN (for example by a stiletto heel) but also compressive and shear resistance.

By means of the stack according to the disclosure, a composite panel is obtained, having very good behavior upon impact (resistance up to 12 J) to be compared with the 7.2 J obtained by prior panels consisting of a Kevlar fabric covering an aluminium honeycomb core.

The resistance of the panels to an impact is measured by means of a drop tower according to AITM 1.0057 of Airbus®.

For certain applications, the specific gravity of the core 1 may be of 72 kg/m$^3$ for a paper thickness comprised between 45 μm and 47 μm. The use of this Nida will be accomplished when the punching requirement may be cancelled or if the skin thickness (presence of one or several intermediate plies) is sufficient for observing the punching stress of 150 daN.

If the increase in the robustness of the assembly is required, an external layer 11 (see FIG. 7) of the pararamide/polyetherimide (PEI) type which may reach 350 g/m$^2$ may be applied on the external face (layer 4b in glass fiber E fabrics) of at least one of the external plies of the composite panel. This external layer, with a thickness of 0.250 mm, guarantees protection against impacts of the whole of the composite panel up to 16 J while optimizing the mass gain and by reducing it to a minimum.

The resistance of the panels to impact is measured by means of a drop tower according to AITM 1.0057 of Airbus®.

The composite panel according to the disclosure may apply this layer under cold conditions by using an adhesive of the Montaprene 2796© type which increases resistance and damping upon impact by its flexibility.

The cold adhesive bonding gives the possibility of associating these materials even if they have very different expansion coefficients.

With panels of the prior art, the adhesive bonding should have been applied under hot conditions, which forces balancing of the panel and therefore, covering both external plies of this pararamide/PEI layer.

The characteristics of the panel according to the disclosure, in particular the presence outwards of a glass fiber E fabric, and inside webs of carbon fibers having different orientations, gives the possibility of avoiding balancing of the panels (adhesive bonding with a pararamide/PEI layer on a single face), and therefore limiting the general weight of the panel.

The surface condition of the Kevlar® core 1 is an important datum for observing the peeling conditions. This peeling should be close to the one obtained with a honeycomb of the prior art (aluminium) in order to retain peeling greater than 15 daN.

Figure 8:
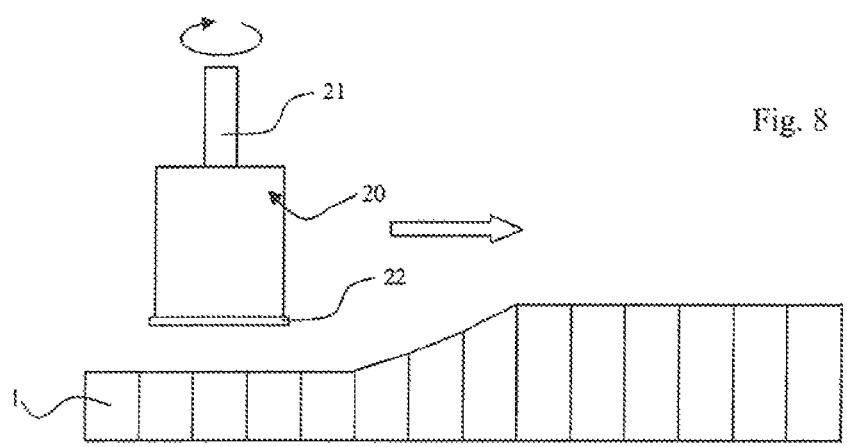
FIG. 8, illustrates a schematic sectional view of the machining of a Kevlar® honeycomb core used in a panel.

For this purpose, as illustrated in FIG. 8, prior to step (a), the disclosure proposes machining of each face of the Kevlar® core 1 by means of a milling cutter 20 including one end engaged with a rotary shaft 21 and a free end including a saw 22. This type of milling cutter is notably manufactured by Neuhauser-Controx GmbH (for example a multi-teeth milling cutter with a diamond coating and a PVD cutting plate with reference 7300-017-050-23-10).

The use of this type of milling cutter gives the possibility of suppressing any manufacturing burr and of obtaining a surface condition such that when the internal ply is adhered onto the core, the peeling is greater than 15 daN, which was never obtained with a Kevlar honeycomb.

As the orientation of the webs has been specified above, the draping (method for laying the layers) should observe the following constraints:
  it is essential that all the fluff or burrs at the surface of the core 1 are or have been suppressed failing which the resistance to peeling of the plies may collapse but also the mechanical strength of the panel may collapse. It is therefore necessary to use a Kevlar® honeycomb core without any burrs.
  the widths of unidirectional carbon fiber webs should not overlap when placing the latter one beside the other, failing which the resistance to peeling and the mechanical strength (flexure) of the panel may collapse. The tolerance interval during laying between two widths: 0 to 2 mm.

The composite panel according to the disclosure allows the use of components directly entering the reduction of the mass of the assembly.

Figure 9:
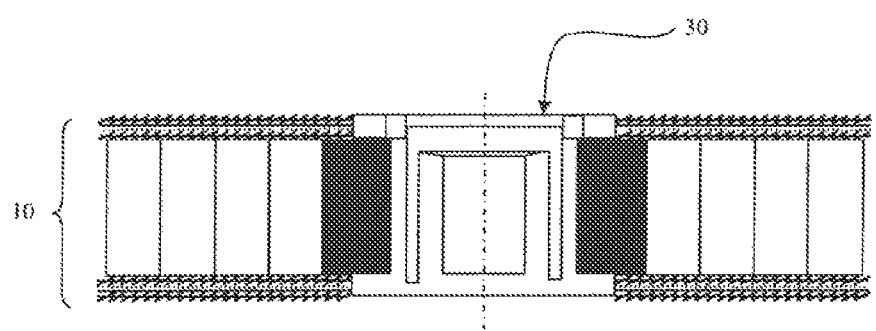
FIG. 9, illustrates a schematic sectional view of an insert in a panel.

It is thus possible to use attachment inserts 30 (see FIG. 9) in non-metal lightweight materials, such as polyamide-imide marketed under the brand of Torlon®, instead of stainless steel inserts used in the panels of the state of the art.
  The following inserts may be used:
  a floating insert of the AEP1035-3S375 type or a fixed insert of the AEP1036-3-12 type, from ADVANCED ENGINEERED PRODUCTS, INC.

This type of Torlon® insert allows a 50% gain in mass for each attachment required upon completion. The use of this type of inserts is made possible by the presence of the fabric 2a-3a under the unidirectional carbon fiber web 2b-3b which considerably increases the hold of the skin on the Kevlar® honeycomb core 1. This greater resistance to peeling of the skin thus allows by means of trepanning of the nida better diffusion of the forces included in the insert and therefore putting to work the assembly of the complex (Nida+skin+insert+adhesive of the insert) and not only the insert and its adhesive.

In order to attach these inserts 30 in the panel, the panel is locally machined over at least one portion of its thickness in order to produce wells in which are positioned attachment inserts in polyamide-imide. The machining is for example trepanning with a diameter 3 mm greater than that of the insert. And then the insert is positioned and the empty space between the insert and the panel is filled with a structural adhesive of the ADEKIT® A171/H9971 type from AXSON®. This adhesive ensures the holding of the insert and guarantees its resistance to tensile and shear forces required by aircraft manufacturers in their technical specifications.

Therefore the disclosure gives the possibility of obtaining a lightweight composite panel and also performing, even more performing than the panels of the state of the art.

The panels according to the disclosure may be used as composite floors, composite partitions, composite covering panels, pieces of furniture or composite structures.

The invention claimed is:

1. A composite panel comprising:
  a honeycomb core in poly(p-phenyleneterephthalamide), on either side of which are positioned two skins each comprising:
  an internal ply in contact with the honeycomb core, and comprising:
    a glass fiber E fabric impregnated with at least 70% by weight of epoxy resin, and with a mass of less than or equal to 30 g/m$^2$, the fabric being in contact with the honeycomb core; and
    a web of unidirectional carbon fibers oriented along a first direction, with an elastic modulus between 275 and 300 GPa, with a mass of less than or equal to 100 g/m$^2$, and pre-impregnated with between 30% and 40% by weight of an epoxy resin;
  an external ply, in contact with the corresponding internal ply comprising:
    a web of unidirectional carbon fibers oriented along a second direction different from the first direction of the web of carbon fibers of the internal ply, with an elastic modulus between 275 and 300 GPa, with a mass of less than or equal to 100 g/m$^2$, and pre-impregnated with between 30% and 40% by weight of an epoxy resin, the web of unidirectional carbon fibers of each external ply facing the web of unidirectional carbon fibers of the corresponding internal ply and
    a fabric of glass fiber E with a mass of less than or equal to 30 g/m$^2$, and pre-impregnated with at least 70% by weight of epoxy resin.

2. The composite panel according to claim 1, wherein the epoxy resin is self-extinguishable.

3. The composite panel according to claim 1, wherein the honeycomb core has a ribbon direction L and an expansion direction W, perpendicular to the ribbon direction L, and wherein the first direction of the web of unidirectional carbon fibers is perpendicular to the ribbon direction L.

4. The composite panel according to claim 1, wherein the second direction of the web of carbon fibers of the external ply forms an angle with the first direction of the web of carbon fibers of the internal ply, is between 45° and 135°.

5. The composite panel according to claim 1, further comprising between an internal ply and an external ply, at least one web of unidirectional carbon fibers with a mass of less than or equal to 100 g/m$^2$, pre-impregnated with between 30% and 45% by weight of an epoxy resin, and oriented along the same second direction as the one of unidirectional carbon fibers of the web of unidirectional carbon fibers of the external plies.

6. The composite panel according to claim 1, wherein:
the glass fibers E have:
   a maximum tensile strength equal to 3,400 MPa,
   an elastic modulus of about 70,000 MPa, and
   a relative specific gravity equal to 2.5 g/cm$^3$; and
the carbon fibers have:
   a maximum tensile strength between 4,000 and 7,000 MPa,
   an elastic modulus between 275,000 and 300,000 MPa and
   a relative specific gravity equal to 1.8 g/cm$^3$.

7. The composite panel according to claim 1, further comprising a fabric of pararamide fibers associated with a polyetherimide (PEI) resin.

8. The composite panel according to claim 1, further comprising attachment inserts in polyamide-imide.

9. The composite panel according to claim 4, wherein said angle is between 60° and 120°.

10. The composite panel according to claim 9, wherein said angle is 90°.

11. A method for manufacturing a composite panel comprising:
depositing on either side of a honeycomb core in poly(p-phenyleneterephthalamide), an internal ply comprising:
   in contact with the honeycomb core, a fabric of glass fiber E with a mass of less than or equal to 30 g/m$^2$, and pre-impregnated with at least 70% by weight of epoxy resin; and
   in contact with the glass fiber E fabric, a web of unidirectional carbon fibers with an elastic modulus between 275 and 300 GPa with a mass of less than or equal to 100 g/m$^2$, and pre-impregnated with between 30% and 40% by weight of an epoxy resin, positioned so that the carbon fibers are oriented along a first direction;
depositing facing the web of unidirectional carbon fibers of each internal ply, an external ply comprising:
   facing the web of unidirectional carbon fibers of the corresponding internal ply, a web of unidirectional carbon fibers positioned so that the fibers are oriented along a second direction, different from the first direction of the web of carbon fibers of the internal ply, with an elastic modulus between 275 and 300 GPa with a mass of less than or equal to 100 g/m$^2$, and pre-impregnated with between 30% and 40% by weight of an epoxy resin; and
   in contact with the web of unidirectional carbon fibers oriented along the second direction, a fabric of glass fiber E with a mass less than or equal to 30 g/m$^2$, and pre-impregnated with at least 70% by weight of epoxy resin, in order to obtain a stack of composite layer.

12. The manufacturing method according to claim 11, further comprising depositing between each internal ply and the external ply at least one web of unidirectional carbon fibers with a mass of less than or equal to 100 g/m$^2$, and pre-impregnated with between 30% and 40% by weight of an epoxy resin, oriented along the same second direction as the one of the unidirectional carbon fibers of the web of unidirectional carbon fibers of the external plies.

13. The manufacturing method according to any of claim 11, wherein, prior to said depositing of either side of a honeycomb core, each face of the honeycomb core is machined with a milling cutter including a saw at the end of the cutter.

14. The manufacturing method according to claim 13, wherein the panel is locally machined on at least one portion of its thickness, in order to produce wells in which are positioned attachment inserts in polyamide-imide held in position with an adhesive.

* * * * *